United States Patent [19]

Vercellotti et al.

[11] 4,016,429
[45] Apr. 5, 1977

[54] POWER LINE CARRIER COMMUNICATION SYSTEM FOR SIGNALING CUSTOMER LOCATIONS THROUGH GROUND WIRE CONDUCTORS

[75] Inventors: Leonard C. Vercellotti, Verona; Ian A. Whyte, Pittsburgh, both of Pa.

[73] Assignee: Westinghouse Electric Corporation, Pittsburgh, Pa.

[22] Filed: Jan. 16, 1976

[21] Appl. No.: 649,774

[52] U.S. Cl. .......................... 307/149; 340/310 R; 340/310 A
[51] Int. Cl.² ...................................... H04B 13/02
[58] Field of Search ................. 307/3, 4, 11, 12, 27, 307/149; 340/310 R, 310 A, 310 CP; 336/174, 175

[56] References Cited
UNITED STATES PATENTS

| | | | |
|---|---|---|---|
| 1,518,683 | 12/1924 | Baker | 340/310 R X |
| 3,702,460 | 11/1972 | Blose | 340/310 A |
| 3,911,415 | 10/1975 | Whyte | 340/310 A |

Primary Examiner—Robert K. Schaefer
Assistant Examiner—Morris Ginsburg
Attorney, Agent, or Firm—R. W. Smith

[57] ABSTRACT

Carrier current signals are impressed to and detected from grounding conductors connected to the power system and to real earth ground. The communication links provided by the grounded neutral conductors of the power system and by the real earth ground return path transmit the carrier communication signals between a substation communication terminal and remote communication terminals at the premises of utility company customers. The communication signals are coupled to the ground conductors by transformer-type couplers in which the grounding conductor constitutes one winding of the transformer.

9 Claims, 7 Drawing Figures

POWER LINE CARRIER COMMUNICATION SYSTEM FOR SIGNALING CUSTOMER LOCATIONS THROUGH GROUND WIRE CONDUCTORS

BACKGROUND OF THE INVENTION

1. Field of the Invention

This invention relates, in general, to power line carrier communication systems and, more specifically, to distribution network power line communication systems which transmit carrier current communication signals through commonly grounded neutral line conductors.

2. Description of the Prior Art

It has been found desirable to improve techniques for establishing communication links through the power conductors of a power distribution system. These communication links provide communication data and/or control information between the customers of an electrical utility company and a central communication terminal.

When the central communication terminal is located at a substation site, communication signals can be transmitted through the power line conductors of a distribution network to the remote terminals at individual customer premises. This avoids expensive and alternate communication transmission lines and/or radio link systems.

Some conventional systems include transmitter and receive circuits which impress and detect high-frequency carrier signals between pairs of power line conductors of a distribution network. Frequency translating and signal reconditioning repeaters are used to amplify and retransmit the power line communication signal through common pairs of power line conductors forming the communication links.

It has been recognized that the neutral line conductors of a distribution network provide a continuous unbroken metallic conduction path between a substation and subdistribution points, including distribution transformers, and to the secondary distribution portions serving individual utility company customers. These neutral line conductors are connected to real earth ground at multiple grounding points by grounding conductors located at the customer premises, the distribution points, and at various other equipment locations associated with the distribution network, as well as at the substations which feed the distribution networks.

A power line carrier communication system is described in U.S. Pat. No. 3,702,460, filed Nov. 30, 1971 by J. B. Bloose, in which communication signals are impressed onto a neutral conductor and a phase conductor. The phase conductor is also referred to as a line or hot conductor as distinguished from the neutral conductor which is connected to the system ground distribution network. The communication links for the communication signals are established between points where the neutral conductor is isolated from the true earth grounding points at the communication signal frequency being used. This isolation is provided by a separate circuit network. Thus, the conductors, including the neutral line which provides the transmission link for communication signals, are isolated from the true earth ground. This requires expensive isolating circuit arrangements to afford the communication links desired between remote terminals, such as provided at customer premises and at a substation site.

Therefore, it is desirable, and it is an object of this invention, to provide a communication system for power line networks which uses only the grounded uninterrupted neutral conductor of the power distribution network to provide the metallic conductor portion of the communication link.

SUMMARY OF THE INVENTION

There is disclosed herein a new and useful distribution network power line carrier communication system for transmitting high-frequency carrier current signals over grounded uninterrupted neutral conductors of a distribution network and for affording a signal return path through real earth ground. The carrier current communication signals are coupled to grounding conductors connected between the neutral line conductors and real earth ground. Current transformers having ferrite magnetic cores couple the carrier current signals to the grounding conductors. A central or interrogation communication terminal is coupled at the grounding conductor located at a substation site and a remote response communication terminal is coupled to a grounding conductor located at a customer premise.

Low-impedance current transformer circuits are used to couple the carrier current signals to and from the neutral line conductor in which the 1:N turns ratio of the transformer primary and secondary windings may be adjusted to provide the proper secondary impedance at the frequency utilized for the carrier current communication signals. Coupling at the substation is provided at a separate grounding conductor distinguished from the grounding conductor normally associated with the substation equipment so as to avoid large currents which flow may in the regular substation grounding conductor.

The carrier current signals are confined to multiple loops, including each of the grounding means or conductors which connect the neutral lines of the distribution network to real earth ground. Each loop dissipates some of the carrier signal. However, by using signalling methods which provide good communication reliability with relatively high signal-to-noise ratios, sufficient signal is available at remote customer premises to interrogate an energy meter or to control the power delivered to the load.

The distribution network of this invention may be provided with a repeater arrangement so as to increase the range of carrier signals transmitted between the substation station and the customer premise. Short circuits occurring in the distribution network have negligble additional effect upon the communication links since multiple points of the neutral line conductor are already connected to real earth ground through the multiple grounding conductors included therein.

Low cost magnetic core transformers are utilized to couple the communication signal to the ground wire conductor and to detect communication signals. The magnetic core transformers are simple and easily applied to the grounding wire by completing the core around the ground wire conductor. The low-impedance circuits of the current transformers are particularly advantageous since they do not interfere with the normal and proper use of the grounding wire conductor at the power current frequencies, typically in the order of 50 to 60 Hz. The magnetic core current transformers may include resonant circuits to change the circuit impedance to desired values and to aid in increasing the amount of communication signal available for enhancing the efficiency of the transmission system.

It is a general feature of this invention to provide a ground wire distribution network power line carrier communication system in which communication signals are coupled to a grounding wire conductor for transmission through a common neutral conductor of a power network and utilize earth ground as a communication signal return path so as to avoid the use of the line or hot conductors of the power network. Another feature of this invention is to impress and detect carrier current signals by current transformers coupled to the grounding wire conductors which are connected to a neutral line conductor of a distribution network and to real earth ground.

BRIEF DESCRIPTION OF THE DRAWING

Further advantages and uses of this invention will be more apparent when considered in view of the following detailed description and drawing, in which.

DESCRIPTION OF THE PREFERRED EMBODIMENT

Figure 1:
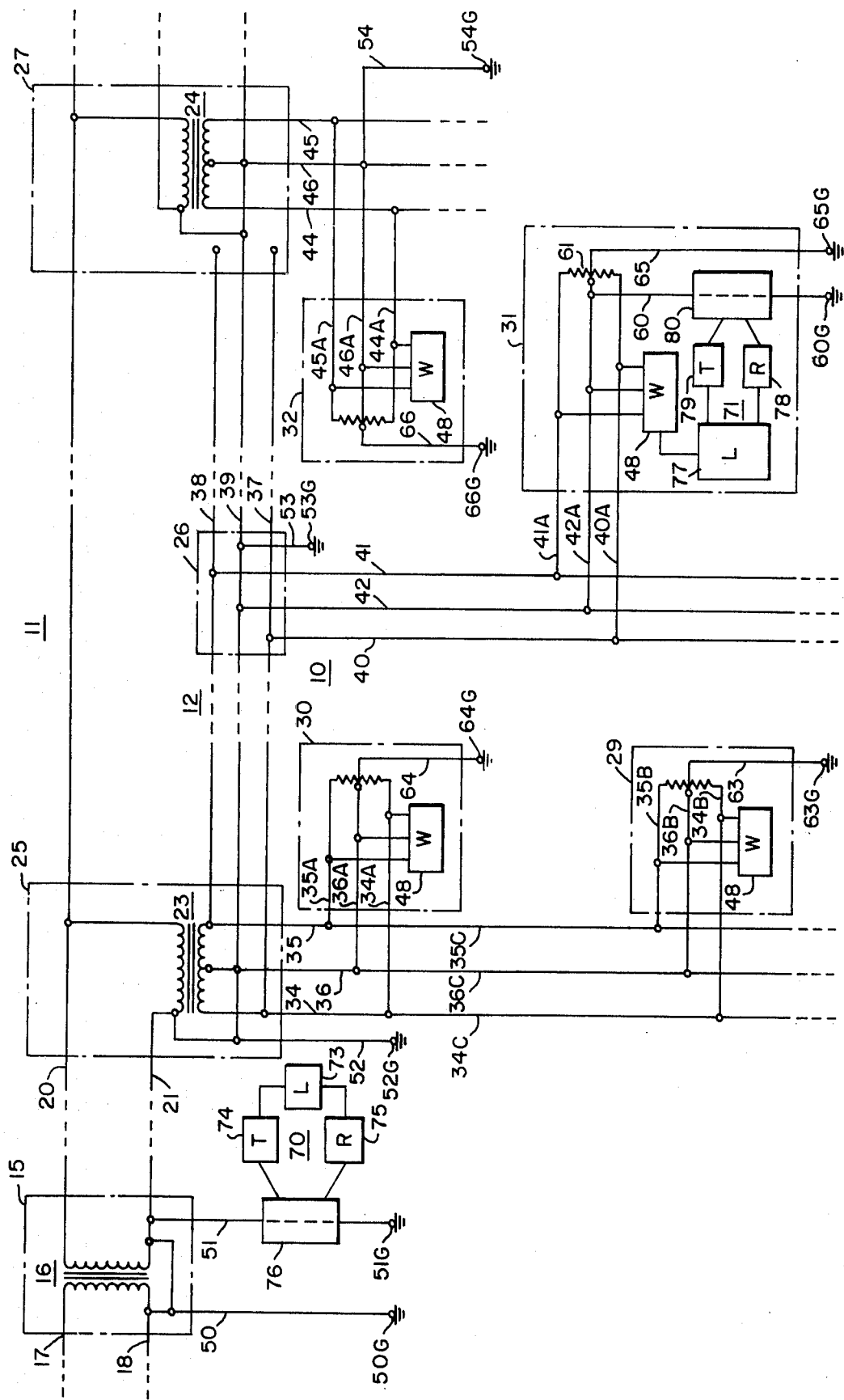
FIG. 1 is a combined block and schematic diagram of a ground wire distribution network power line carrier communication system constructed in accordance with the present invention.

Throughout the following description, similar reference characters refer to similar elements or members in all of the Figures of the drawing.

Referring now to the drawing, and to FIG. 1 in particular, there is shown a ground wire power line carrier communication system 10 constructed according to this invention. The communication system 10 includes a power distribution network 11 and communication links for carrier current signals which are provided by the distribution network 11 and associated earth ground return paths described in further detail hereinafter. Initially, the general arrangement of the distribution network 11 is described for a better understanding of the invention.

By way of example and not by limitation, the distribution network 11 is provided by an electric utility company to distribute alternating electrical power signals, typically in the order of 60 Hz, from a substation 15. The substation high-voltage transformer 16 has a primary grounded conductor 21 which is connected to the secondary winding of the transformer 16 and conduct the 60 Hz power signals in the network 11 at moderate voltage levels.

The primary conductor 20 is connected to each of the distribution transformers in the network 11, such as the distribution transformers 23 and 24. The primary grounded neutral conductor 21 is connected to only the closest distribution transformer to the substation 15, such as the transformer 23. Locations 25, 26 and 27 provide connection points for serving the various branches of the secondary portion 12 of the distribution network 11. Locations 25 and 27 are adjacent to the transformers 23 and 24. The location 26 is adjacent to a branch line not located adjacent to a distribution transformer. The secondary distribution portion 12 conducts the power signals at low-voltage levels derived from the secondary of the transformers 23 and 24. A large number of customer locations or premises may be associated with the various branch lines, such as represented by the customer premises 29, 30, 31 and 32.

Ungrounded secondary wire conductors 34 and 35 and a grounded neutral secondary conductor 36 are connected to the secondary winding of the distribution transformer 23. This conventional three-wire signal-phase connection delivers low-voltage distribution power which is utilized by the loads at the customer premises. The service conductors 34A, 35A and 36A connect the customer wiring at the customer premise 30 to the secondary conductors 34, 35 and 36, respectively. The service conductors 34B, 35B and 36B connect the secondary conductors 34, 35 and 36, respectively, to the customer wiring at the customer premise 29.

The secondary conductors 37, 38 and 39 are connected to the junctions of the secondary conductors 34, 35 and 36 at the secondary winding of the transformer 23. These conductors extend between the pole locations 25 and 26, which would normally be at poles or other supporting structures, to serve secondary conductors 40, 41 and 42 which are connected to the conductors 37, 38 and 39 at pole location 26. The service conductors 40A, 41A and 42A are connected, respectively, to conductors 40, 41 and 42 for connecting the load at the customer premise 31 to the secondary conductors 40, 41 and 42. The secondary conductors 37 and 38 extend also to the pole location 27 where they are "dead-ended" near the secondary transformer 24.

The distribution transformer 24 provides a three-wire single-phase secondary distribution portion including the ungrounded conductors 44 and 45 and the grounded conductor 46 which are connected to the secondary winding of the transformer 24. These conductors supply the service conductors 44A, 45A and 46A which are connected to the customer wiring and loads at the customer premise 32. Normally, a watthour meter 48 is connected to the service conductors at each of the customer premises 29, 30, 31 and 32.

A common grounded neutral conductor is formed in the network 11 by the interconnection of the grounded conductors which include the customer wiring, the grounded service conductors, the grounded secondary conductors, and the grounded primary conductor 21. The interconnected grounded conductors form a solid metallic wire connection which is uninterrupted by the distribution transformers between the customer premises and the substation 15. The conductors forming the common grounded neutral lines are connected to real earth ground at numerous points in the network 11. At the substation 15, a grounding conductor 50 is connected to one terminal of the primary and secondary windings and to real earth ground terminal 50G. A second grounding conductor 51 is connected to the ground terminal 51G and to the grounded primary conductor 21 for purposes which will be described in more detail hereinafter.

At each of the pole locations 25, 26 and 27, grounding conductors 52, 53 and 54 are provided in accordance with usual distribution network practices. These conductors are connected to real earth ground at grounding terminals 52G, 53G and 54G. At the distribution transformers 23 and 24, one terminal of the primary is connected to ground by connections to the grounding conductors 52 and 54 as shown. Further, the grounded primary terminal is connected to the center tap of the secondary winding terminals, as shown, so that the neutral secondary conductors 36 and 46 are connected to real earth ground through grounding conductors 52 and 54, respectively.

Each of the neutral service conductors are grounded at a customer premise, usually at a location between the connection of the watthour meter and the entrance to the customer building or dwelling. For example, the grounding conductor 60 is connected between the watthour meter 48 and the customer wiring and load 61 at the customer premise 31. The conductor 60 is connected to real earth ground at terminal 60G. Further, the customers wiring and loads are typically grounded by additional conductors, such as by connection to "water pipe" grounds within the building or dwelling. Therefore, the grounding conductors 63, 64, 65 and 66 are connected in common with the neutral service conductors by the customers wiring at the customer premises 29, 30, 31 and 32. Grounding terminals for these conductors, such as provided by "water pipe connections," are indicated at 63G, 64G, 65G and 66G for the corresponding numbered grounding conductors. The ground wires described are all "directly" connected to ground. That is, there is substantially a straight unlooped conductor extending to ground which does not have any significant lumped impedance element in series therewith. Such a description of "directly to ground" applies to such terminology used in the claims.

The ground wire carrier communication system 10 will now be described with respect to the distribution network 11 previously described. A communication link is further described between the customer premise 31 and the substation 15. However, the communication system 10 is intended to establish a communication link between the substation and all of the customer premises.

A central or interrogation terminal 70, as shown in FIG. 1, is located at or adjacent to the substation 15 and a remote or response communication terminal 71 is located at the customer premise 31. These terminals may be of the general type disclosed in, U.S. Pat. No. 3,911,415 which is assigned to the assignee of this invention. In accordance with the aforementioned application, the substation terminal includes a logic circuit 73, an interrogation transmitter 74, a response receiver 75, and a ground line coupler 76. Correspondingly, the customer remote terminal 71 includes a logic circuit 77, an interrogation receiver 78, a response transmitter 79, and a ground line coupler 80. The couplers 76 and 80, which will be described further hereinafter, link carrier current signals between the transmitters or receivers and the grounding wires 51 and 60 at the substation 15 and at customer terminal 71, respectively.

The substation terminal 70 and the customer terminal 71 are preferably arranged to transmit and receive carrier current signals which are of the frequency-shift-key modulated type in which two frequencies represent binary states of logic which correspond to information signals handled in the logic circuits 73 and 77. The reference carrier frequency of these signals may be in the order of about 25 to 400 kilohertz for representing one of the binary states. A small fractional bandwidth deviation, for example from 2 to 10 kilohertz, may represent the other binary state. It is contemplated, as stated in the above referenced U.S. Pat. No. 3,911,415, that the substation terminal 70 may be connected to a central communication terminal by radio or commercial telephone line or other land line communication links. The customer terminal 71 may be associated with remote meter reading or load control apparatus, such as the watthour meter 48 at the customer premise 31.

The readings of the watthour meter 48 are encoded by the logic circuit 77 as described in the referenced application. A logic encoded word format includes an encoded address portion so that the carrier current signals originating from the interrogation transmitter 74 would be sensed by the interrogation receiver 78 at the customer premise 31. Accordingly, the logic encoded word format initiated from the response transmitter 79 would include an encoded identification portion associated with the customer premise 31. It is noted here that it is within the scope of this invention that each of the customer premises associated with the distribution network 11 could have a response communication terminal, such as the terminal 71. Accordingly, each of the customer premises would have a unique identification code and/or have frequency response characteristics which are different from other response terminals, and the carrier current signals may have different frequency bandwidths for selectively signaling different communication terminals in the communication system 10.

Figure 2:
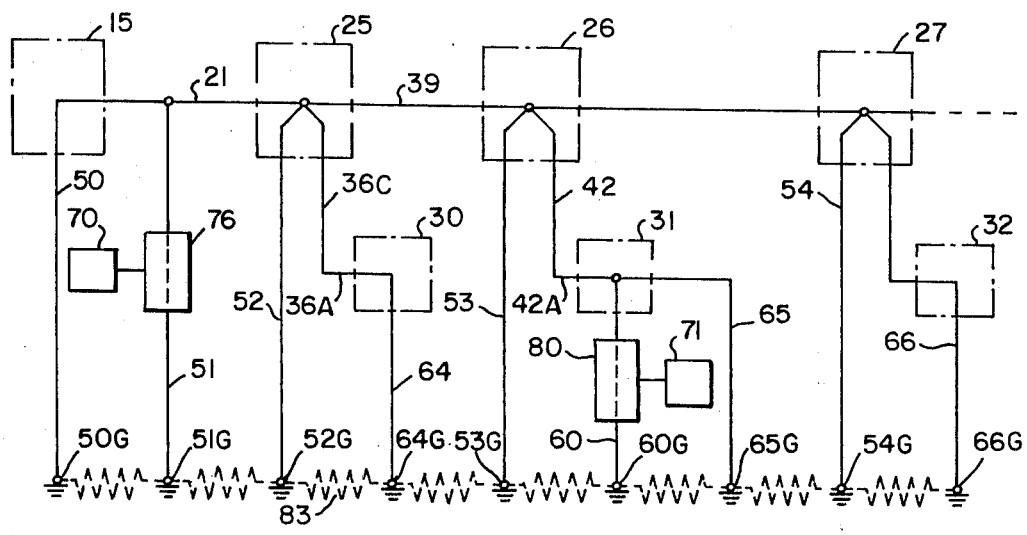
FIG. 2 is a one-line schematic diagram of carrier current signal paths existing in the system illustrated in FIG. 1.

The multiple parallel circuit loops provided through the neutral line and earth ground paths are described by reference to FIG. 2. FIG. 2 is a oneline schematic diagram of the carrier current signal paths which are in parallel with the communication link between the substation terminal 70 and the customer terminal 71. The dashed lines 83 at the bottom of the schematic shown in FIG. 2 represent the real earth ground path included in the return portion of the communication link established for the carrier current signals. The earth ground return path 83 includes resistances which represent small but measurable amounts of resistance between the ground terminals as the signals flow through the earth.

Assuming that a carrier communication signal is generated by the terminal 70 and applied, through the coupler 76, to the ground wire 51, several paths for the communication signal exist. The particular path of propagation in this specific example of communication signal transmission between substation and customer premise includes the ground conductor 51, the primary neutral grounded conductor 21, the neutral secondary conductor 39, the ground conductors 42 and 60, and the real earth ground return path 83. It is pointed out that other communication paths also exist in communicating between the terminals 70 and 71, and additional paths would be involved when the communication terminal 70 is communicating with a customer premise terminal located at another customer premise.

The signal coupled to the ground wire 51 by the coupler 76 produces a voltage between the real earth ground terminal 51G and the conductor 21 due to the relativity low but finite impedance of the ground conductor 51. It is also pointed out that even though the impedance of the ground conductor is relatively low, the signal loss through the real earth ground path 83 is also relatively low since the path 83 also presents a low impedance. Therefore, no high impedance power consuming or restricting elements are present which offer obstruction to propagation of the communication signal from one location to another.

Several parallel paths are connected across the real earth ground terminal 51G and the neutral ground wire 21. Each path conducts a portion of the communication signal current and has developed thereacross a portion of the communication signal voltage. However, due to the relatively low impedance of all of the elements involved, a somewhat equal distribution of signals is provided through each of the grounding conductors located at the various customer premises. Therefore, sufficient power is transmitted from the coupler 76 to the customer premise for communication purposes provided the number of parallel paths is not too excessive. Each parallel path consumes or diverts some of the communication signal back through the return path 83 to the coupler 76.

The coupler 76 is coupled to the grounding wire 51 which is located at the substation 15. However, the power current is conducted primarily through the substation ground wire 50 instead of through the ground wire 51. Using a separate ground wire for the communication system components assures that saturation of the coupler and the associated interference will not occur if unbalanced currents in the power distribution system flow through the substation grounding wire 50.

Figure 3:
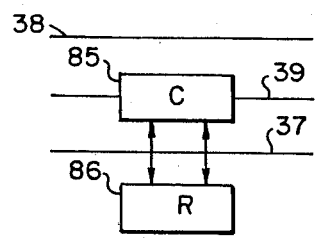
FIG. 3 is a fragmentary portion of the system illustrated in FIG. 1 including a signal repeater.

FIG. 3 shows a portion of the distribution network 11, for example, between the pole locations 25 and 26. The coupler 85 is coupled to the neutral secondary conductor 39 and connects to a frequency translating and reconditioning repeater 86 as described in the referenced U.S. Pat. No. 3,911,415. Signals transmitted between the substation terminal 70 and the customer terminal 71 would then be reconditioned and amplified for transmission over longer distances.

Figure 4:
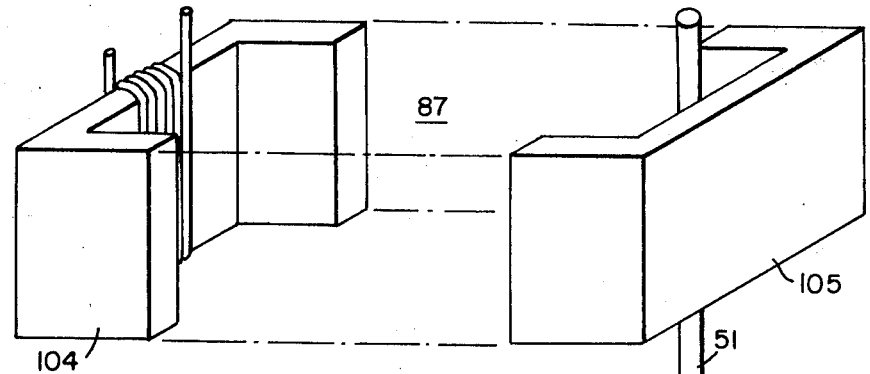
FIG. 4 is a view of a coupler used for coupling carrier current signals to the system illustrated in FIG. 1.
Figure 4:
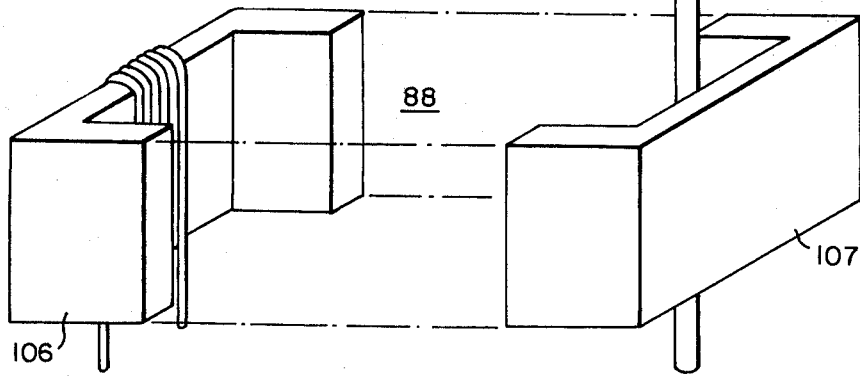

Referring now in particular to the arrangement of the current transformer couplers 76 and 80, FIG. 4 illustrates current transformers 87 and 88 which can be used to replace either or both of the couplers 76 and 80 shown in FIG. 1. The transformers 87 and 88 consist of the two-piece, U-shaped core members 104, 105, 106 and 107 which are shown separated but which would normally be arranged so that their facing sides are engaged to encircle a grounding wire, such as the wire 51. One-half of each transformer is made of a commercially available ferrite material and includes a few turns of wire to provide a secondary winding having the desired number N of turns. The grounding wire 51 would form a single turn primary so as to provide a low-impedance transmission circuit. These low-impedance coupling circuits are a particularly important feature because they do not interfere with the normal and proper use of the grounding wire at the power frequency. In addition, such ferrite cores saturate at large currents, thereby giving low inductance and allowing only a small amount of voltage to be developed across the magnetic cores during fault current conditions.

Figure 5:
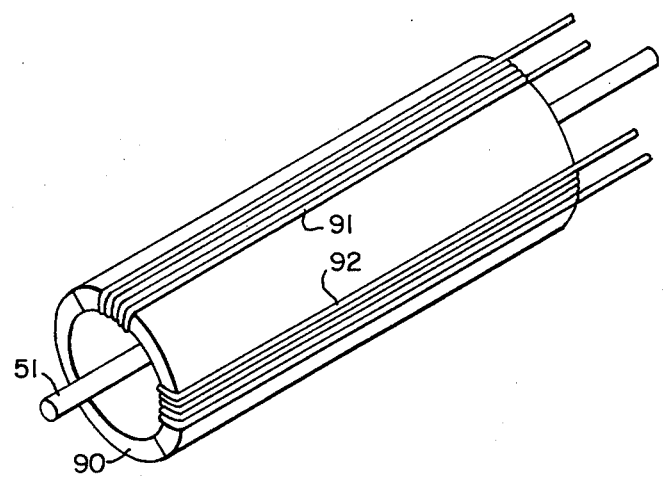
FIG. 5 is a view of an alternative coupler which may be used according to the teachings of this invention.

In FIG. 5, there is shown a transformer coupler which includes a substantially hollow cylindrical ferrite core 90 encircling the ground wire 51 in which the carrier current signals are to be coupled to or detected from. The winding 91 may be connected to the receiver of the communication terminal and the winding 92, which as a different 1:N turns ratio than the winding 91, may be connected to the transmitter of the communication terminal. The number of turns on either of the windings 91 and 92 may vary depending upon the required turns ratio, the frequencies of a carrier current signal, and whether or not the windings are to be tuned.

Figure 7:
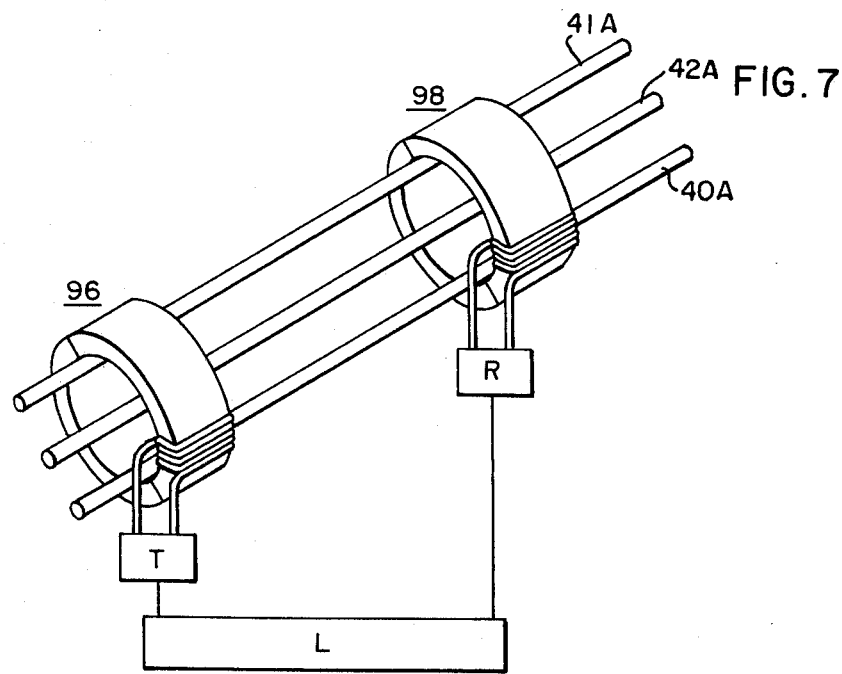
FIG. 7 is a diagram of an alternative coupler arrangement for coupling carrier current to a fragmentary portion of the system illustrated in FIG. 1.

FIG. 7 shows a coupler arrangement including current transformer couplers 96 and 98 which include magnetic cores similar to those described herein. These cores are applied around all three of the distribution secondary conductors or around all three service conductors, such as conductors 40A, 41A and 42A. This can be done since the power current through the ungrounded or live conductors, such as 40A and 41A, will balance and neutralize each other so that the net current through the three wires is substantially equal to zero. It is also to be noted that the carrier current signals in the line conductors are conducted no further than the distribution transformer neutral since the distribution transformer acts as a choke at carrier communication frequencies.

Figure 6:
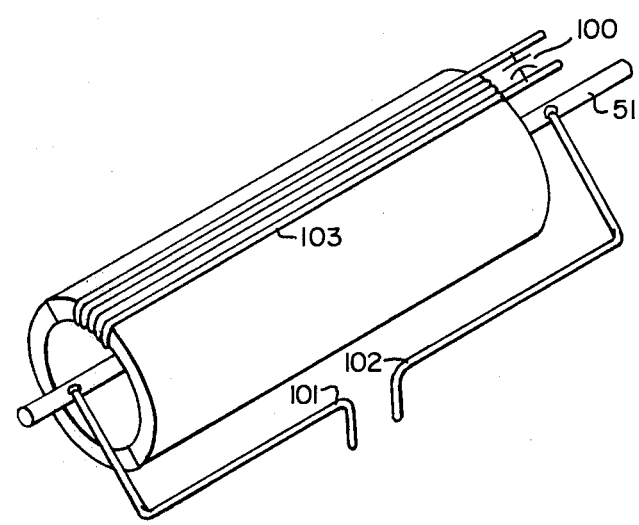
FIG. 6 is a view of a further alternative coupler which may be used according to the teachings of this invention.

A further modification of the coupler arrangement 76 and 80 is shown in FIG. 6 wherein a magnetic core is used in which the wires 101 and 102 are connected directly to the grounding conductor 51. A predetermined number of turns are provided on the ferrite core and a capacitor 100 is connected across the leads of the winding 103 formed by these turns. The wires 101 and 102 are connected either to the receiver or transmitter and the tuned winding leads are connected to other of the transmitter or receiver. The tuned circuit arrangement adds further flexibility to the desired impedances under given conditions of the signal frequencies and power line impedances which would normally be encountered by the carrier current signal. Due to the impedance presented by the coupler between connection points of the wires 101 and 102 on the conductor 51, a true short circuit at carrier communication frequencies does not exist.

Since numerous changes may be made in the above described apparatus, and since different embodiments of the invention may be made without departing from the spirit thereof, it is intended that all the matter contained in the foregoing description, or shown in the accompanying drawing, shall be interpreted as illustrative rather than limiting.

What we claim is:

1. A power line communication system for conveying carrier current signals between two locations in an electrical power system including a distribution transformer, comprising:
   a first ground wire which connects an uninterrupted neutral conductor of the power system directly to real earth ground at a first of the two locations;
   means including a first current transformer having a single turn primary formed by said first ground wire for inducing a first current signal in said first ground wire in response to first communication signals;
   a second ground wire which connects said neutral conductor of the power system directly to real earth ground at the second of the two locations; and
   means including a second current transformer having a single turn primary formed by said second ground wire for detecting a second current signal in the second ground wire which is responsive to the first current signal.

2. The communication system of claim 1 wherein the first location is at a power system substation.

3. The communication system of claim 2 wherein the first ground wire at the substation is substantially paralleled by another ground wire which conducts most of the power current between the neutral conductor and earth ground.

4. The communication system of claim 1 wherein the second location is at a power customer premise and wherein a repeater means is coupled to said neutral conductor for receiving said first current signal and transmitting said second current signal.

5. The communication system of claim 4 wherein the second ground wire at the customer premise is substantially paralleled by another ground wire which conducts most of the power current between the neutral conductor and earth ground.

6. The communication system of claim 1 wherein the means for inducing the first signal in the first ground wire includes a closed magnetic core disposed around the first ground wire, and a winding disposed around said core and connected to means for generating the first communication signals.

7. The communication system of claim 1 wherein the means for detecting the second current signal in the second ground wire includes a closed magnetic core disposed around the second ground wire, and a winding disposed around said core and connected to means for processing second communication signals.

8. The communication system of claim 1 including means for inducing a third current signal in the second ground wire responsive to second communication signals, said second communication signals being transmitted in a direction opposite to the direction of transmission of the first communication signals, and means for detecting a fourth current signal in the first ground wire which is responsive to the second communication signals.

9. The communication system of claim 8 wherein the means for inducing the first current in the first ground wire includes a closed magnetic core disposed around the first ground wire, a winding disposed around said core and connected to means for generating the first communication signals, a capacitor connected in parallel relationship with said winding, and wherein the means for detecting the fourth current in the first ground wire includes a first lead connected directly to the first ground wire at one end of said magnetic core, and a second lead connected directly to the first ground wire at the other end of said magnetic core, said first and second lead being connected to means for processing the second communication signals.

* * * * *